United States Patent
Courtois et al.

[11] Patent Number: 5,860,703
[45] Date of Patent: Jan. 19, 1999

[54] VEHICLE SEAT INCLUDING A HEADREST, AND A HEADREST FOR A VEHICLE SEAT

[75] Inventors: Bernard Courtois, Morigny; Adolfo Castro, Fresnes, both of France

[73] Assignee: Bertrand Faure Equipements S.A., Boulogne, France

[21] Appl. No.: 902,227

[22] Filed: Jul. 29, 1997

[30] Foreign Application Priority Data

Jul. 31, 1996 [FR] France ................................. 96 09642

[51] Int. Cl.$^6$ ................................................. A47C 7/36
[52] U.S. Cl. ................................... 297/410; 297/404
[58] Field of Search ........................... 297/410, 408, 297/391, 404

[56] References Cited

U.S. PATENT DOCUMENTS

| | | | |
|---|---|---|---|
| 3,635,527 | 1/1972 | Weber | 297/410 |
| 4,111,484 | 9/1978 | Jaeger | 297/410 |
| 4,191,423 | 3/1980 | Goldner | 297/408 |
| 4,256,341 | 3/1981 | Goldner et al. | 297/410 |
| 4,390,209 | 6/1983 | Izuno et al. | 297/410 |
| 4,577,904 | 3/1986 | Wiese et al. | 297/410 |
| 4,589,698 | 5/1986 | Suzuki | 297/410 |
| 5,529,379 | 6/1996 | Stöcker | 297/410 |
| 5,713,635 | 2/1998 | De Filippo | 297/410 |

FOREIGN PATENT DOCUMENTS

| | | |
|---|---|---|
| 2 035 354 | 12/1970 | France . |
| 2 413 236 | 7/1979 | France . |
| 2 606 345 | 5/1988 | France . |
| 29 02 246 | 7/1980 | Germany . |

*Primary Examiner*—Milton Nelson, Jr.
*Attorney, Agent, or Firm*—Marshall, O'Toole, Gerstein, Murray & Borun

[57] ABSTRACT

The vehicle seat has a seat back that is extended upwards by a headrest. The headrest is supported by at least one rigid stalk that is vertically slidable in a socket secured to the seat back, with a certain amount of clearance for forward pivoting. The stalk is urged angularly rearwards by a spring towards a rest position in which notches formed in the rear face of the stalk co-operate with a stop member secured to the socket. Starting from this rest position, the headrest can be moved angularly forwards by a user into an adjustment position where the stalk is free to slide vertically in the socket.

12 Claims, 4 Drawing Sheets

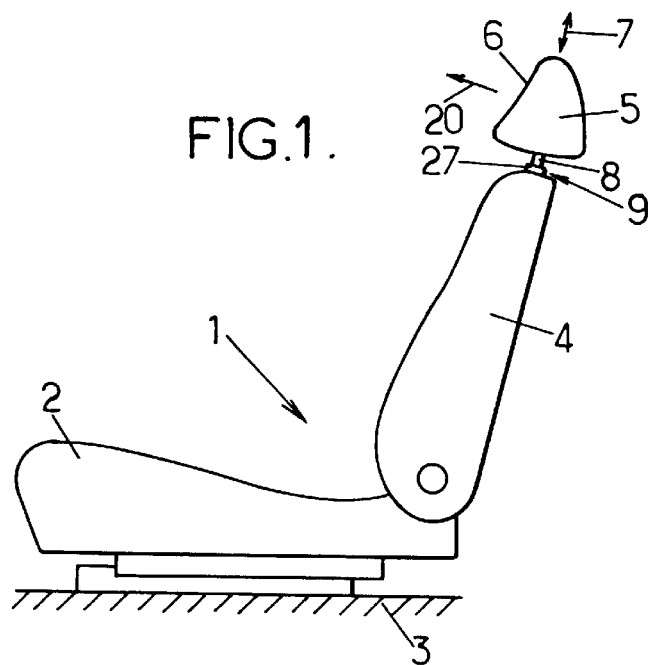
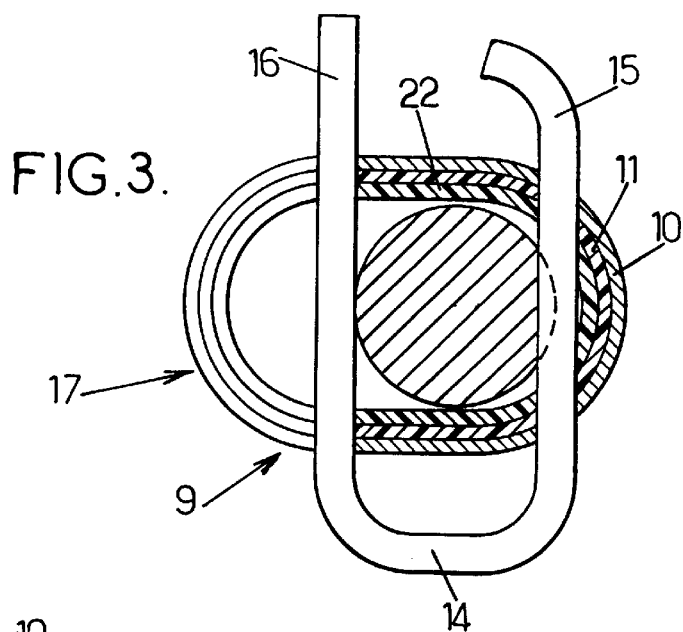
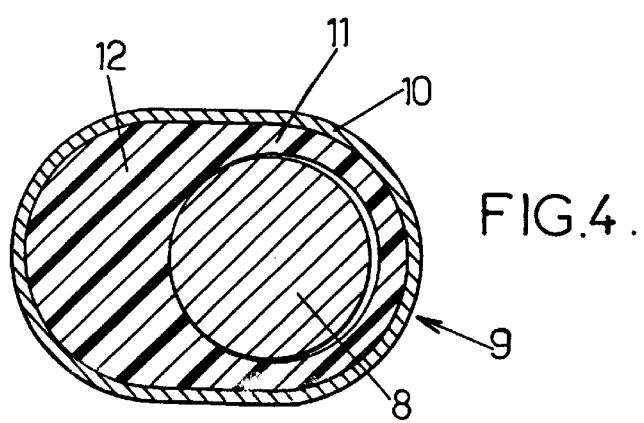

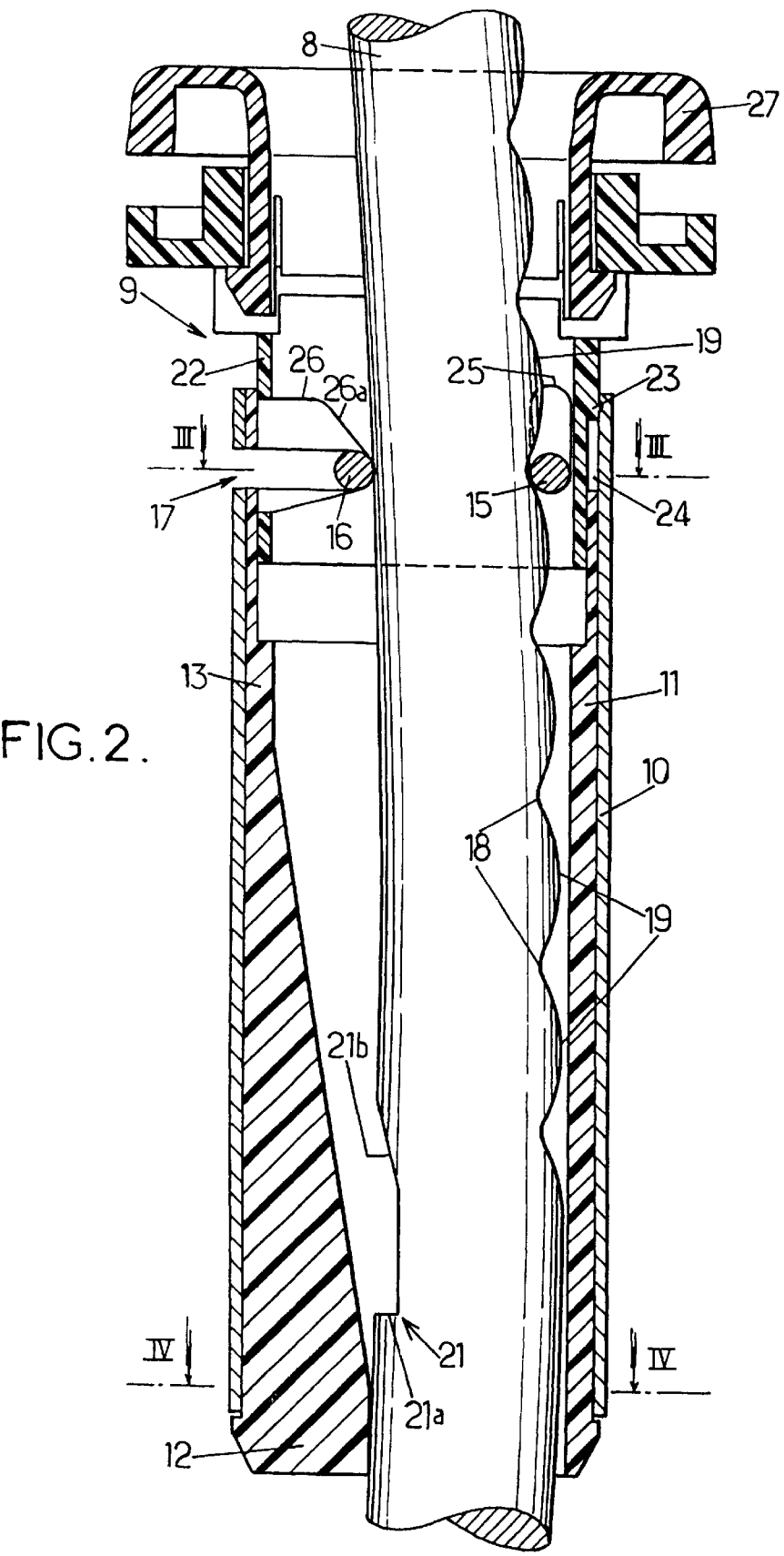

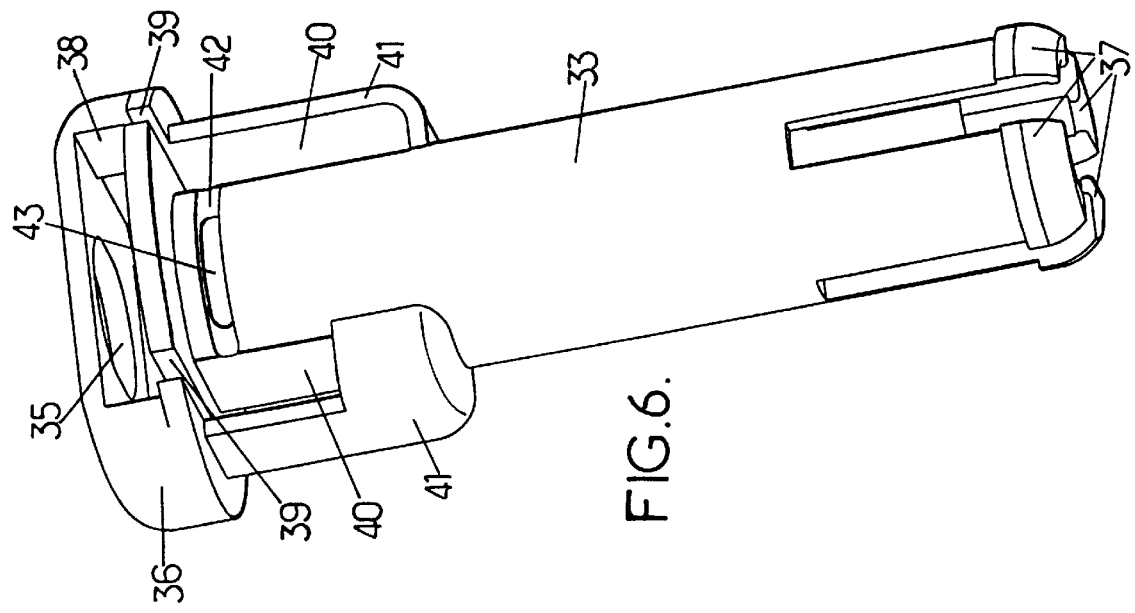
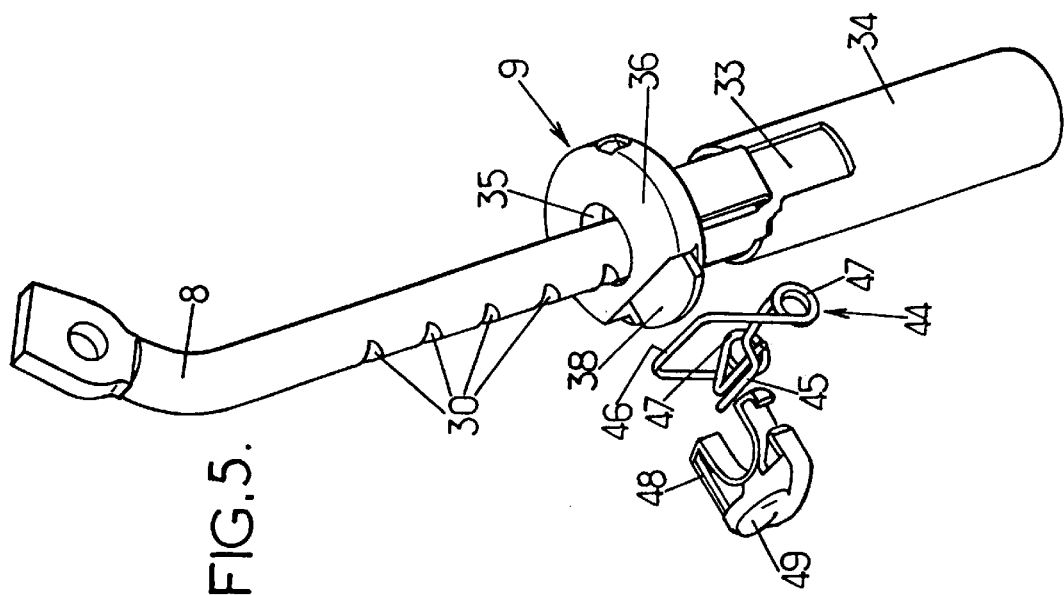

VEHICLE SEAT INCLUDING A HEADREST, AND A HEADREST FOR A VEHICLE SEAT

FIELD OF THE INVENTION

The present invention relates to vehicle seats that have headrests, and to headrests for vehicle seats.

More particularly, the invention relates to a vehicle seat including a seat back which is extended upwards by a headrest provided with a front face for supporting the back of a user's neck, said headrest being supported by at least one rigid stalk which slides vertically in a socket secured to the seat back with a certain amount of clearance for pivoting forwards, the headrest being urged angularly rearwards by resilient means towards a rest position in which locking means prevent the stalk from sliding vertically, and the headrest being angularly displaceable forwards by a user against the urging of the resilient means to an adjustment position in which the stalk can slide vertically in the socket.

BACKGROUND OF THE INVENTION

Document FR-A-2 035 354 discloses an example of such a vehicle seat.

Nevertheless, that vehicle seat suffers from the drawback of requiring relatively complex assembly of the stalk of the headrest inside the corresponding socket.

OBJECTS AND SUMMARY OF THE INVENTION

A particular object of the present invention is to mitigate that drawback.

To this end, according to the invention, in a vehicle seat of the kind in question the locking means comprise a stop member secured to the socket and located behind the stalk, said stop member co-operating, when the headrest is in its rest position, with notches formed along the stalk and facing rearwards.

In preferred embodiments, it is possible also to make use of one or more of the following dispositions:

- the headrest is supported by two parallel stalks each sliding in a respective socket and each having rearwardly facing notches that co-operate with a corresponding stop member;
- the socket carries a spring having first and second substantially horizontal limbs penetrating inside said socket on opposite sides of the stalk, the first limb being engaged substantially without clearance in the socket and constituting the above-mentioned stop member, the second limb being received in the socket with a certain amount of horizontal clearance and bearing resiliently against the stalk urging it rearwards to press the notches of said stalk against the first limb of the spring;
- the stalk has a bottom portion with a single forwardly-directed stop for co-operating with the second limb of the spring, so as to prevent the stalk from escaping from the socket;
- the socket comprises a fixed portion and a slide which is displaceable relative to the fixed portion under drive from a pushbutton accessible to a user on top of the seat back, the slide being adapted to co-operate with the second limb of the spring to move said second limb horizontally rearwards when the pushbutton is actuated, thereby preventing any co-operation between the second limb of the spring and the stop of the stalk;
- the slide is movable vertically relative to the fixed portion of the socket under drive from the pushbutton, the slide having at least one cam surface suitable for co-operating with the second limb of the spring to move said second limb horizontally away from the first limb when the pushbutton is actuated;
- the spring is in the form of a spring clip folded substantially into a U-shape, the first and second limbs of the spring forming respective resilient limbs of the U-shape;
- the socket has both a bottom guide which extends vertically over a short distance and receives the stalk with little clearance, thus constituting a bottom pivot point for the stalk, and, above the bottom guide, a top portion which receives the stalk with greater clearance and which has a horizontal inside section that is oblong with a long axis extending forwards and backwards;
- the notches are constituted by superposed indentations separated from one another by rounded projecting bulges;
- the stalk has a longitudinal axis and the notches which are formed on the rear face of the stalk are each in the form of a top stop face which is substantially perpendicular to the axis of the stalk and a bottom sloping face with its high end forward of its low end;
- the first and second limbs of the spring are interconnected on either side of the stalk by two resilient legs extending substantially vertically downwards from said first and second limbs, the second limb of the spring being situated at a higher level than the first limb, the socket including an inner bushing surrounded by a rigid outer jacket and pierced by a substantially vertical well in which the stalk slides, the inner bushing having a rear portion which is pierced horizontally by a guide channel opening out both towards the rear of the socket and into the well of said bushing, the guide channel being situated at the same level as the second limb of the spring and extending over a width that corresponds to said second limb, the slide being mounted in the guide channel to be capable of co-operating with said second limb of the spring, the rear portion of the bushing also having a horizontal groove which receives the first limb of the spring and which presents a central portion opening out into the well of the bushing, such that the first limb of the spring itself presents a central portion that projects into the well of the bushing to co-operate with the notches formed in the rear face of the stalk, the jacket of the socket covering said horizontal groove so as to hold the second limb of the spring captive in said groove, and the rear portion of the bushing also having two vertical slots which communicate with the guide channel and which are disposed to correspond with the two resilient legs of the spring so as to enable the second limb of the spring to be engaged in said guide channel during assembly of the socket; and
- the inner bushing of the socket has an enlarged top head in which the guide channel which receives the slide is formed, the bushing also having a bottom end provided with snap-fastening hooks adapted to hold said inner bushing in the outer jacket when the inner bushing is engaged in said outer jacket by being slid therealong.

In addition, the invention also provides an assembly constituting a headrest for a vehicle seat as defined above, the assembly comprising the headrest proper, the support stalk(s) for said headrest, the corresponding socket(s), the locking means, and the resilient means.

BRIEF DESCRIPTION OF THE DRAWINGS

Other characteristics and advantages of the invention appear from the following detailed description of two embodiments, given as non-limiting examples and with reference to the accompanying drawings.

In the drawings:

FIG. 1 is a diagrammatic view of a vehicle seat of the invention;

FIG. 2 is a vertical section view showing how one of the stalks supporting the headrest of the FIG. 1 seat is mounted in a first embodiment of the invention;

FIGS. 3 and 4 are section views respectively on lines III—III and IV—IV of FIG. 2;

FIG. 5 is an exploded view showing one of the stalks which support the headrest of the FIG. 1 seat, together with the corresponding socket, in a second embodiment of the invention;

FIG. 6 is a perspective view of the inner bushing belonging to the socket shown in FIG. 5.

MORE DETAILED DESCRIPTION

Figure 7:
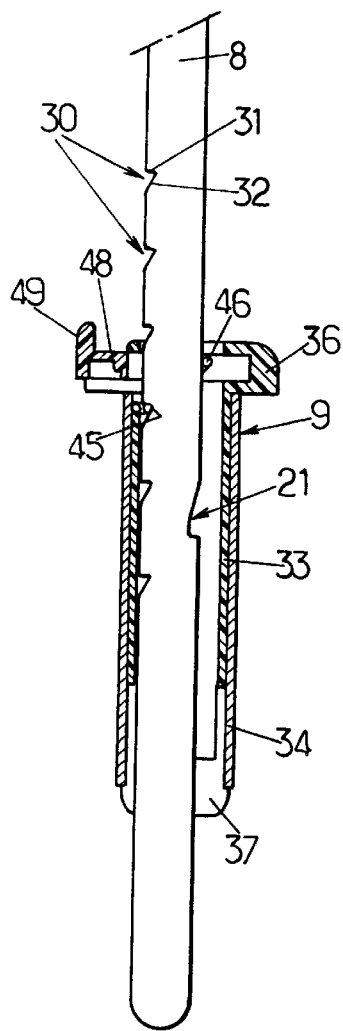
FIGS. 7 to 9 are vertical section views showing the FIG. 5 stalk and socket respectively in a normal, in-use position, while the height of the headrest is being adjusted, and while the headrest is being removed.

FIG. 1 shows a motor vehicle seat 1 comprising firstly a seat proper 2 mounted on the floor 3 of the vehicle and secondly a back 4 mounted on the seat proper 2 and extended upwards by a headrest 5.

The headrest has a front face 6 for supporting the back of the neck of a user of the seat, and said headrest is adjustable in height along double-headed arrow 7 so that the back of the user's neck rests comfortably against the front face 6.

To this end, the headrest 5 is supported by two metal stalks 8 that may be solid or tubular, only one of which is visible in FIG. 1, the stalks extending downwards from the headrest and penetrating into the portion of the back 4 where they slide vertically in sockets 9 secured to the back 4.

As shown in greater detail in FIGS. 2 to 4, each socket 9 in a first embodiment of the invention comprises:

firstly an outer metal jacket 10 of tubular shape having a horizontal section that is oblong with its long axis extending forwards and backwards, said metal jacket being fixed to the metal framework (not shown) of the back 4, e.g. by welding; and an inner bushing 11 of plastics material which is disposed inside the metal jacket 10, the bushing 11 having a bottom portion 12 which extends over a small height and which receives the bottom portion of the stalk 8 with little clearance, thus constituting a pivot point for the stalk, and with the inside passage of the bushing 11 flaring upwardly from the portion 12 to form a tubular top portion 13 of oblong inside section with its long axis extending forwards and backwards, thereby enabling the stalk 8 and the headrest 5 to pivot forwards and backwards.

Also, in the vicinity of the top end of each socket 9, the metal jacket 10 and the bushing 11 receive a resilient metal part 14 in the form of a spring clip that is generally U-shaped having two lateral limbs 15 and 16 both engaged in the jacket 10 and the bushing 11 and penetrating into the inside passage defined by the bushing.

The first limb 15 of each clip 14 is engaged substantially without clearance in the jacket 10 and the bushing 11, while the second limb 16 of the clip is engaged in a horizontal slot 17 formed in the jacket 10 and the bushing 11, thereby enabling said second limb 16 to move resiliently away from the first limb 15.

Also, each stalk 8 has corrugations along its height facing rearwards and constituted by superposed notches 18 in the form of indentations separated from one an other by rounded bulges 19.

Under the effect of the resilient thrust exerted by the second limb 16 of each clip 14 against the front portion of the corresponding stalk 8, the rear portion of the stalk bears against the first limb 15 of the spring clip: this limb 15 is thus engaged in one of the notches 18 of the stalk 8, thus locking vertical sliding of the stalk in the socket 9.

When the user of the seat presses the back of the neck against the front face 6 of the headrest, whether deliberately or because of the vehicle being subjected to a shock from behind, this action reinforces the locking of the two stalks 8 of the headrest by means of the first limbs 15 of the corresponding spring clips 14.

However, when the user of the seat desires to adjust the height of the headrest, the user pulls the headrest 5 so that it pivots forwards in the direction of arrow 20 as shown in FIG. 1, against the resilient force of the second limbs 16 of the clips 14 corresponding to the two stalks of the headrest.

During this movement, each stalk 8, together with the second limb 16 of the corresponding clip 14, moves away from the first limb 15 of said clip, such that the notches 18 and the bulges 19 of the stalk no longer co-operate with the first limb 15 of the corresponding clip 14.

The user can then adjust the height of the headrest by causing the stalks 8 to slide in the sockets 9.

It may be possible for the user to adjust the height of the headrest without needing to pull the headrest forwards, with the first limb 15 of the spring clip 14 then sliding over the notches 18 and the bulges 19 during vertical movement of the stalks 8 in the socket 9.

In order to prevent the stalks being extracted involuntarily from the sockets 9 while the height of the headrest is being adjusted or because of the vehicle being subjected to a front shock, each of the stalks 8, or preferably only one of the two stalks 8, advantageously includes near its bottom end a forwardly-directed stop which co-operates with the second limb 16 of the corresponding clip 14 to limit upward displacement of the stalk.

This stop may be constituted, for example, by a cutout 21 which has a stop face 21a extending in a radial plane and facing upwards, and a sloping face 21b whose high end is forward of its low end.

The socket 9 comprising to the stalk 8 which has the cutout 21 includes a slide 22 of plastics material in its top end which is engaged as a sliding fit inside the bushing 11.

The slide 22 is guided to slide vertically inside the bushing 11, e.g. by means of a rib 23 on the slide engaged in a corresponding groove 24 in the bushing 11.

The slide 22 also has the two limbs 15 and 16 of the spring clip 14 passing therethrough, said slide having a vertical oblong slot 25 level with both ends of the first limb 15 of the spring clip, and a forwardly open cutout 26 which receives both ends of the second limb 16 of the spring clip.

At the two ends of the second limb 16 of the spring clip, or at least in the vicinity of the free end of the second limb 16, the cutout 26 of the slide presents a sloping cam surface 26a whose high end is forward of its low end.

This cam surface 26a is designed to move the second limb 16 away from the first limb 15 of the spring clip when the slide 22 is moved downwards under drive from a pushbutton 27 surrounding the stalk 8 and accessible to the user at the top of the seat back 4, the pushbutton 27 optionally being implemented in the form of a part fitted to the slide 22, as shown in the drawings.

Thus, by pressing on the pushbutton 27, the user can prevent the second limb 16 of the clip 14 from co-operating with the cutout 21 when it is desired to remove the headrest 5.

Figure 8:
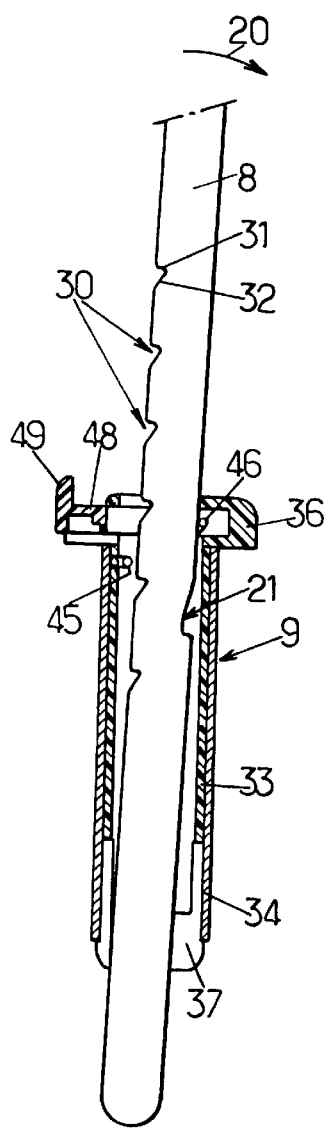
Figure 9:
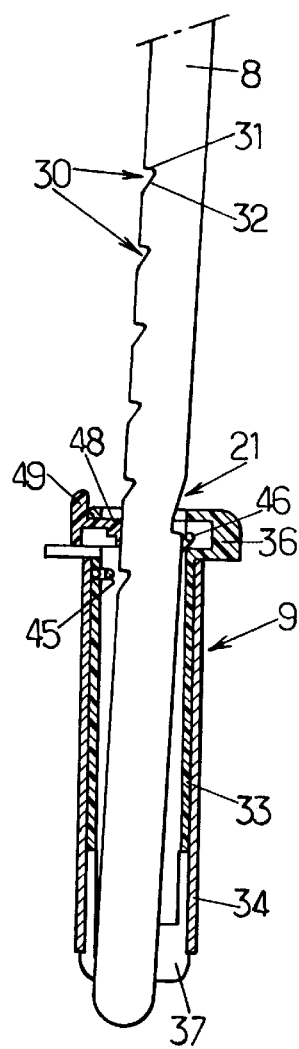

In the second embodiment of the invention, shown in FIGS. 5 to 9, the two stalks 8 of the headrest have notches 30 disposed on the rear of the stalk 8, each of the notches 30 presenting, for example, a top stop face 31 that is substantially perpendicular to the longitudinal axis of the stalk and a sloping bottom face 32 whose high end is forward of its low end (see FIGS. 7 to 9).

It will be observed that the notches 18 of the first embodiment of the invention could possibly be replaced by notches similar to the notches 30, and that the notches 30 of the second embodiment of the invention could possibly be replaced by notches similar to the notches 18.

Also, one of the two stalks 8 of the headrest advantageously includes a forward-facing bottom stop 21 constituted, for example, as described above, by a bottom stop face and by a sloping face whose high end is forward of its low end.

Also, the socket 9 in which the stalk 8 slides comprises both an inner bushing 33 which may be made of plastics material, for example, and a rigid outer jacket 34 which may be made of metal, and in which the bushing 33 is engaged.

The inner bushing 33 defines a substantially vertical well 35 in which the corresponding stalk 8 slides, the well 35 being shaped to allow the stalk 8 to move at least forwards and backwards.

As shown in FIG. 6, the bushing 33 extends vertically between an enlarged head 36 disposed on the top of the seat back 4, and a bottom end which is axially split to form four resilient hooks 37 projecting radially outwards and suitable for catching beneath the outer jacket 34 when the bushing 33 is engaged in said jacket.

The enlarged head 36 of the bushing 33 is pierced horizontally by a guide channel 38 of rectilinear section, this channel opening out towards the front of the enlarged head 36 and also into the well 35 thereof.

On either side, the guide channel 38 also communicates with two vertical slots 39 formed in the enlarged head 36 and opening out downwards into two lateral housings 40 each partially covered by a side wall 41.

In addition, in the rear face of the bushing 33 there is formed a horizontal groove 42 whose central portion 43 opens out into the well 35.

Also, a spring 44 of resilient metal wire is mounted in the bushing 33, as can clearly be seen in FIG. 5. The spring comprises:

a first horizontal limb 45 constituted by two parallel lengths of metal wire, or optionally by a single length of wire;

a second horizontal limb 46 parallel to the first limb 45 and disposed at a higher level than the first limb; and two resilient legs 47 connecting the first and second limbs together and extending downwards from the ends of said first and second limbs on either side of the spring 44.

During assembly of the socket 9, the first limb 45 of the spring is engaged in the guide channel 38 from the rear face of the bushing 33 while the resilient legs 47 are engaged in the slots 39 and the housings 40. In addition, the first limb 45 of the spring engages in the groove 42, with the central portion of said limb 45 thus projecting into the well 35.

After the spring 44 has been installed, the bushing 33 is engaged in the corresponding jacket 34, with the jacket covering the groove 42 and thus holding the first limb 45 of the spring captive in said groove.

Thereafter the corresponding stalk 8 is engaged in the well 35 with the first limb 45 of the spring then co-operating with the notches 30 of the stalk, and with the second limb 46 of the spring bearing against the front of the stalk 8 and urging the notches 30 against the first limb 45 of the spring (FIG. 7).

In addition, the second limb 46 of one of the springs 44 may optionally co-operate with the stop 21 of the corresponding stalk to avoid the stalk 8 being ejected involuntarily from the socket 9.

Finally, a U-shaped slide 48 that can be actuated by a pushbutton 49 is mounted in the guide channel 38 corresponding to the stalk 8 which has the stop 21, so as to make it possible to push the second limb 46 of the spring forwards.

Because of this disposition, when the user of the seat seeks to raise the headrest, the user pulls the headrest forwards in the direction of arrow 20 (FIG. 8), thereby disengaging the notches 30 from the first limb 45 of the spring, after which the user can slide said headrest vertically.

To raise the headrest, the user can act in the same manner, or can merely pull the headrest upwards, with upward stroke of the headrest nevertheless being limited by the stop 21.

Also, when the user seeks to remove the headrest completely, this can be done by pushing on the pushbutton 49 which urges the second limb 46 of the spring far enough forwards to prevent the second limb engaging the stop 21 (FIG. 9), thus enabling the stalk 8 to be extracted from the socket 9.

We claim:

1. A vehicle seat including a seat back which is extended upwards by a headrest provided with a front face for supporting a back of a user's neck, said headrest being supported by at least one rigid stalk which slides vertically in a socket secured to the seat back with a certain amount of clearance for pivoting forwards, the headrest being urged angularly rearwards by resilient means towards a rest position in which locking means prevent the stalk from sliding vertically, and the headrest being angularly displaceable forwards by a user against the urging of the resilient means to an adjustment position in which the stalk can slide vertically in the socket, wherein the locking means comprise a stop member secured to the socket and located behind the stalk, said stop member co-operating, when the headrest is in its rest position, with notches formed along the stalk and facing rearwards in which the socket carries a spring having first and second substantially horizontal limbs penetrating inside said socket on opposite sides of the stalk, the first limb being engaged substantially without clearance in the socket and constituting the above-mentioned stop member, the second limb being received in the socket with a certain amount of horizontal clearance and bearing resiliently against the stalk urging it rearwards to press the notches of said stalk against the first limb of the spring.

2. A seat according to claim 1, in which the headrest is supported by two parallel stalks each sliding in a respective socket and each having rearwardly facing notches that co-operate with a corresponding stop member.

3. A seat according to claim 1, in which the spring is in the form of a spring clip folded substantially into a U-shape, the first and second limbs of the spring forming respective resilient limbs of the U-shape.

4. A seat according to claim 1, in which the socket has both a bottom guide which extends vertically over a short distance and receives the stalk with little clearance, thus constituting a bottom pivot point for the stalk, and, above the bottom guide, a top portion which receives the stalk with greater clearance and which has a horizontal inside section that is oblong with a long axis extending forwards and backwards.

5. A seat according to claim 1, in which the notches are constituted by superposed indentations separated from one another by rounded projecting bulges.

6. A seat according to claim 1, in which the stalk has a longitudinal axis and the notches which are formed on the rear face of the stalk are each in the form of a top stop face which is substantially perpendicular to the axis of the stalk and a bottom sloping face with its high end forward of its low end.

7. A vehicle seat according to claim 1, wherein the headrest forms an assembly comprising the headrest proper, the support stalk for said headrest, the corresponding socket, the locking means, and the resilient means.

8. A seat according to claim 1, in which the stalk has a bottom portion with a single forwardly-directed stop for co-operating with the second limb of the spring, so as to prevent the stalk from escaping from the socket.

9. A seat according to claim 8, in which the socket comprises a fixed portion and a slide which is displaceable relative to the fixed portion under drive from a pushbutton accessible to a user on top of the seat back, the slide being adapted to co-operate with the second limb of the spring to move said second limb horizontally rearwards when the pushbutton is actuated, thereby preventing any co-operation between the second limb of the spring and the stop of the stalk.

10. A seat according to claim 9, in which the slide is movable vertically relative to the fixed portion of the socket under drive from the pushbutton, the slide having at least one cam surface suitable for co-operating with the second limb of the spring to move said second limb horizontally away from the first limb when the pushbutton is actuated.

11. A seat according to claim 9, in which the first and second limbs of the spring are interconnected on either side of the stalk by two resilient legs extending substantially vertically downwards from said first and second limbs, the second limb of the spring being situated at a higher level than the first limb, the socket including an inner bushing surrounded by a rigid outer jacket and pierced by a substantially vertical well in which the stalk slides, the inner bushing having a rear portion which is pierced horizontally by a guide channel opening out both towards the rear of the socket and into the well of said bushing, the guide channel being situated at the same level as the second limb of the spring and extending over a width that corresponds to said second limb, the slide being mounted in the guide channel to be capable of co-operating with said second limb of the spring, the rear portion of the bushing also having a horizontal groove which receives the first limb of the spring and which presents a central portion opening out into the well of the bushing, such that the first limb of the spring itself presents a central portion that projects into the well of the bushing to co-operate with the notches formed in the rear face of the stalk, the jacket of the socket covering said horizontal groove so as to hold the second limb of the spring captive in said groove, and the rear portion of the bushing also having two vertical slots which communicate with the guide channel and which are disposed to correspond with the two resilient legs of the spring so as to enable the second limb of the spring to be engaged in said guide channel during assembly of the socket.

12. A seat according to claim 11, in which the inner bushing of the socket has an enlarged top head in which the guide channel which receives the slide is formed, the bushing also having a bottom end provided with snap-fastening hooks adapted to hold said inner bushing in the outer jacket when the inner bushing is engaged in said outer jacket by being slid therealong.

* * * * *